United States Patent [19]

Strickland

[11] Patent Number: 4,979,865

[45] Date of Patent: Dec. 25, 1990

[54] LOADING AND UNLOADING APPARATUS FOR PICKUP TRUCKS

[76] Inventor: Jerome R. Strickland, 1991 E. Alameda Ave., Denver, Colo. 80209

[21] Appl. No.: 488,126

[22] Filed: Mar. 1, 1990

[51] Int. Cl.[5] ............................. B60P 1/04; B60P 1/44
[52] U.S. Cl. .................................... 414/486; 212/140; 296/10; 296/39.2; 298/1 A; 298/19 V; 414/540; 414/559
[58] Field of Search ............... 414/471, 486, 491, 494, 414/500, 540, 543, 559; 298/1 A, 19 V; 296/10, 39.2; 212/140, 223, 255

[56] References Cited

U.S. PATENT DOCUMENTS

| | | | |
|---|---|---|---|
| 1,453,663 | 5/1923 | Engler | 298/19 V |
| 1,506,136 | 8/1924 | Remde | 414/471 X |
| 1,897,383 | 2/1933 | Burgoyne | 212/244 |
| 2,033,209 | 3/1936 | Teetor | 298/19 V |
| 2,409,398 | 10/1946 | Shoemaker | 414/543 X |
| 2,496,401 | 2/1950 | McKinney | 414/543 |
| 2,799,402 | 7/1957 | Norman | 414/543 X |
| 2,821,311 | 1/1958 | Screws | 414/543 |
| 2,940,621 | 6/1960 | White | 414/543 |
| 3,066,810 | 12/1962 | Sartin | 414/486 |
| 3,237,989 | 3/1966 | Fulton | 298/19 V |
| 3,377,104 | 4/1968 | Sherman | 298/19 V |
| 3,384,253 | 5/1968 | Wood | 414/486 |
| 3,411,825 | 11/1968 | Fulton | 298/19 R |
| 3,804,263 | 4/1974 | Castonguay | 414/543 |
| 3,826,534 | 7/1974 | Ruff | 298/1 A |
| 3,978,989 | 9/1976 | Avila, Jr. | 414/543 X |
| 4,068,762 | 1/1978 | Kennard, Jr. et al. | 414/543 X |
| 4,069,922 | 1/1978 | Hawkins | 414/543 X |
| 4,629,390 | 12/1986 | Burke | 414/527 |

FOREIGN PATENT DOCUMENTS

| | | | |
|---|---|---|---|
| 211982 | 11/1960 | Australia | 414/543 |
| 1122449 | 9/1956 | France | 414/540 |
| 520851 | 3/1955 | Italy | 414/540 |
| 658579 | 10/1951 | United Kingdom | 414/543 |
| 1109803 | 4/1968 | United Kingdom | 414/486 |

Primary Examiner—David A. Bucci
Attorney, Agent, or Firm—John E. Reilly

[57] ABSTRACT

Apparatus for loading and unloading materials onto and from a truck bed includes a corner-mounted swivel hoist mechanism which is releasably clamped to the walls of the truck bed and includes an upper swivel boom member and a lower winch assembly having a cable which can be passed either upwardly over the boom member or rearwardly along the truck bed; and a dump body can be placed on the truck bed and lifted at its front end by the hoist in dumping materials contained in the body. The dump body has an open frame and an inner flexible liner with a rear flap portion of the liner being releasable to an open or lowered position to facilitate removeal of the contents from the body when tilted.

11 Claims, 2 Drawing Sheets

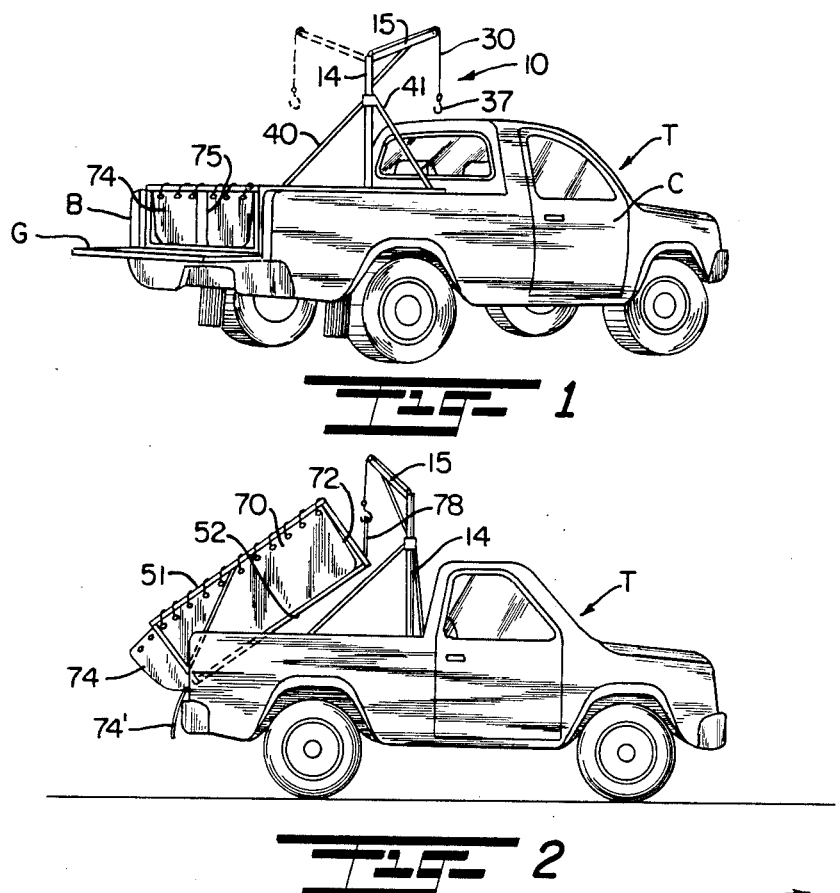
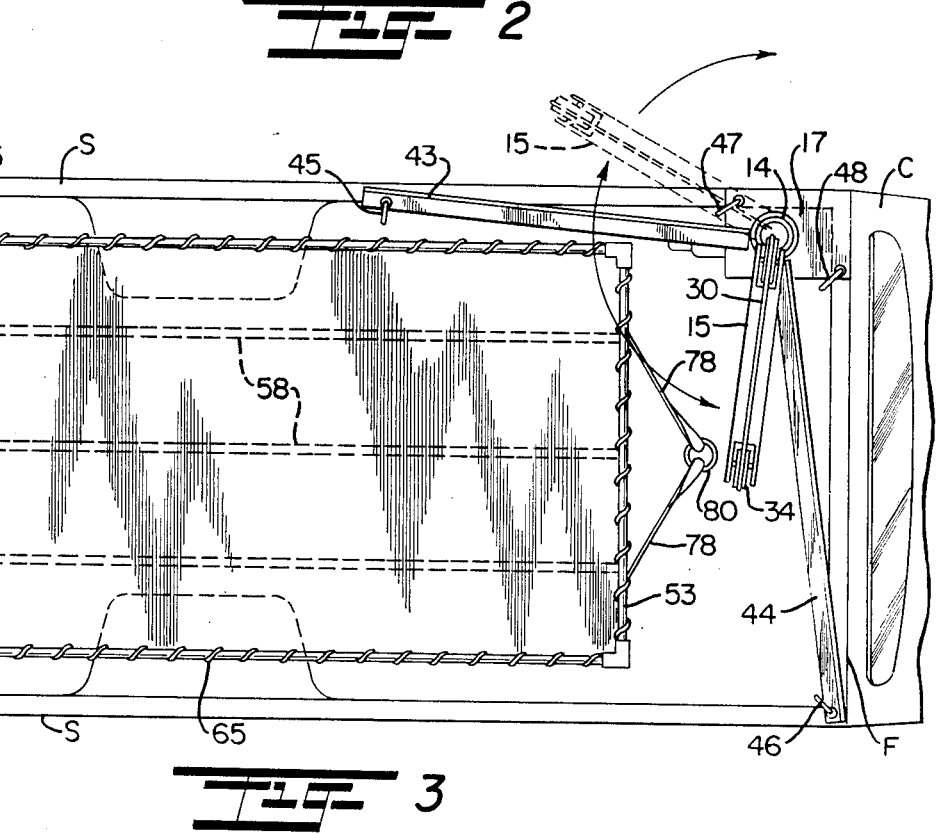

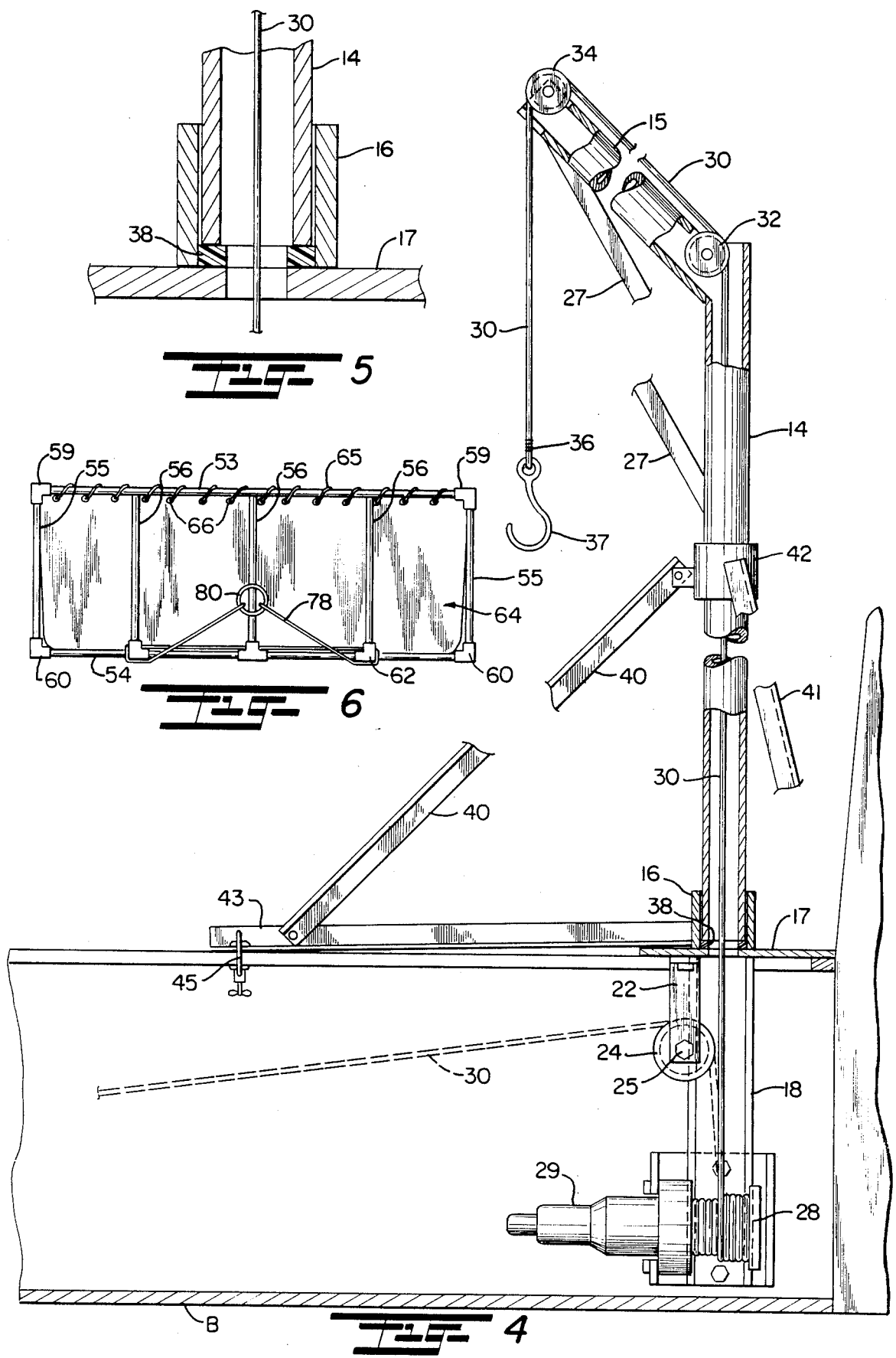

LOADING AND UNLOADING APPARATUS FOR PICKUP TRUCKS

The invention relates to loading apparatus; and more particularly relates to a novel and improved swivel hoist mechanism which can be employed either alone or in combination with a dump body as accessory equipment on a pickup truck.

BACKGROUND AND FIELD OF INVENTION

Accessory hoists and dump bodies have been devised for use on pickup trucks to facilitate the loading and unloading of materials onto and from the truck bed. For example, U.S. Pat. No. 3,377,104 to T. F. Sherman is directed to a combination hoist and dump body for direct attachment to the bed of a pickup truck. The dump body itself is of rigid construction and pivotally attached at its rearward end to the rear end of the truck bed; and in turn the winch or hoist is affixed at the center of the front end of the body for the purpose of lifting the dump body about its pivotal axis in dumping the contents of the body off of the rear of the truck.

U.S. Pat. No. 1,453,663 to W. B. Engler discloses the use of a hoist and dump body in very much the same relationship as Sherman but wherein the hoist has a swinging mast and specifically wherein the mast is free to swing forwardly and rearwardly but not in a lateral direction.

U.S. Pat. No. 1,897,383 to G. W. Burgoyne is directed to the use of a pivotal boom member which can swing about a vertical axis and which is mounted at the front end of a vehicle opposite to the truck bed. Other representative patents are U.S. Pat. Nos. 1,506,136 to E. H. Remde; 2,033,209 to C. N. Teetor; 3,237,989 to L. R. Fulton; 3,411,825 to L. R. Fulton; 3,826,534 to G. G. Ruff; and 4,629,390 to D. D. Burke.

Although the broad combination of accessory hoist and dump box assembly is well known, no one to my knowledge has devised a secure but releasable means of attachment of a swivel hoist mechanism to the corner of a truck bed and in such a way as to enable its effective utilization in combination with a dump body or independently of the dump body in loading or unloading materials onto and from the truck bed. Furthermore, it is desirable to provide for an accessory dump body which can be effectively placed on the truck bed without direct attachment but nevertheless be pivotal about one end when used in combination with the hoist mechanism in dumping operations.

SUMMARY OF THE INVENTION

Accordingly, it is an object of the present invention to provide for a novel and improved hoist mechanism for pickup trucks which can be releasably but securely attached to the bed of the truck and which is highly versatile and dependable in operation.

It is another object of this invention to provide for a novel and improved swivel hoist mechanism which can be detachably positioned on a pickup truck for loading and unloading articles onto and from the truck bed as well as for dumping operations in cooperation with a dump body.

It is yet another object of the invention to provide for a novel and improved dump body for pickup trucks which greatly facilitates loading and unloading of articles onto and from the truck bed; and wherein a swivel hoist mechanism can be securely but releasably mounted on a truck bed without necessity of positive attachment or otherwise modifying or drilling through the structure of the truck bed itself.

A further object of the present invention is to provide for a novel and improved corner-mounted swivel hoist mechanism which is capable of being securely but releasably clamped at a front corner of a truck bed in such a way that the hoist is capable of lateral swinging movement in loading or unloading articles to and from a position away from the truck bed itself; and wherein the hoist mechanism is capable of lifting an accessory dump body in the bed for removal of the contents from the dump body.

In accordance with the present invention, loading and unloading apparatus has been devised for a pickup truck wherein the truck includes a truck bed having opposite sidewalls, front end wall, floor surface and a tailgate, the apparatus comprising a standard including an upper boom member, means mounting the boom member for swinging movement between a position in which a free end of the boom member is disposed inside of the truck bed and a position outside of the truck bed, cable guide means on the boom, a winch assembly including a cable extending upwardly along the standard and boom having a free end portion to be secured to an article to be loaded and unloaded, and releasable securing means for securing the standard to the truck bed. The apparatus as described may be used independently or in combination with a dump body, a preferred form of dump body including an outer frame sized for disposition in the truck bed, an inner flexible liner having an end wall releasably secured to the frame, and means attaching the end wall to the frame which is releasable to lower the one end wall into a position forming an open end for the removal of contents from the dump body.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 1 is a perspective view illustrating a preferred embodiment of the present invention in installed relation to a pickup truck;

FIG. 2 is a side view in elevation of the preferred embodiment of the present invention including a dump body shown in an elevated position under the control of a swivel hoist mechanism;

FIG. 3 is a top plan view in more detail of the preferred embodiment of the present invention;

FIG. 4 is an enlarged view partially in section of the preferred form of swivel hoist mechanism in accordance with the present invention;

FIG. 5 is an enlarged fragmentary view of the swivel portion of the hoist mechanism; and FIG. 6 is a rear view of a preferred form dump body in accordance with the present invention.

DESCRIPTION OF THE PREFERRED EMBODIMENT

Referring in more detail to the drawings, there is shown by way of illustrative example a conventional pickup truck T including a cab section C, and a rear truck bed B has opposite sidewalls S, a front wall F and tailgate G extending upwardly from the truck bed B. The pickup truck T as shown and described is given more as a setting and not by way of limitation in disclosing the preferred form of my invention.

In the preferred form, a swivel hoist mechanism 10 is detachably mounted at a front corner of the truck bed B for the purpose of loading and unloading materials onto and from the truck bed as well as for dumping operations in cooperation with a dump body 12. For this purpose, the preferred form of swivel hoist mechanism 10 comprises an upright hollow post or standard 14 terminating at its upper end in an inclined boom or arm member 15, and the lower end of the standard 14 is disposed in swiveled relation to a sleeve 16 projecting upwardly from a base mounting plate 17. The mounting plate 17 is detachably but rigidly secured to the upper edges of the walls of the truck bed in a manner to be described and has a channel member 18 depending downwardly from the mounting plate for the purpose of suspending a winch assembly 20 in spaced relation to the floor surface of the truck bed B. Bracket arms 22 also depend downwardly from the mounting plate 17 to support a pulley 24 which is journaled for rotation on a stub shaft 25 at the lower end of the brackets 22. The winch assembly 20 may be selected from any one of a number of commercial winches, such as, the Model X-1 manufactured and sold by Superwinch, Inc. of Putnam, Conn. The winch 20 includes a standard reel 28, drive motor 29 and cable 30 which is advanced upwardly through the standard 14 and trained over guide pulleys 32 and 34. The pulleys 32 and 34 are journaled for rotation at opposite ends of the boom 15 and permit the cable 30 to pass over the pulleys 32 and 34 and downwardly to terminate in a free end 36. A suitable hook or other grappling device 37 may be releasably attached to the free end 36 of the cable 30 so that, when desired, the cable may be retracted through the standard and played out in a horizontal direction over the pulley 24.

The swivel hoist mechanism 10 is a two-part assembly consisting of the standard 14, boom member or arm 15 and a brace assembly as hereinafter described as one unitary section; and the mounting plate 17 with attached sleeve 16 and downwardly extending frame support 18, pulley brackets 22 and winch assembly 20 define a second unitary section. The standard 14 is insertable into the sleeve 16 to rest on a low-friction bearing member 38 which rests on the mounting plate 17 as shown in somewhat more detail in FIG. 5. The other unitary part of the upper standard and boom section is the brace assembly comprised of inclined legs or struts 40 and 41 sloping downwardly and away from a common collar 42 affixed to an intermediate portion of the standard 14. A brace 27 inclines upwardly from the collar 42 for attachment to the boom 15. The leg members 40 and 41 incline away from the collar 42 at an angle slightly greater than 90° to one another and are affixed at their lower, distal ends to the ends of a pair of horizontal brace members 43 and 44, respectively, which extend away from the sleeve member 16. The horizontal member 43 extends in a rearward direction along and toward one of the sidewalls S and is releasably clamped by a C-clamp 45 to the sidewall. In turn, the brace member 44 extends across the width of the truck bed and is clamped at its distal end by C-clamp 46 to the opposite front corner of the truck bed. Additional C-clamps 47 and 48 serve to releasably attach opposite diagonal corners of the mounting plate 17 to the side and front walls of the truck bed as illustrated. The combination of the horizontal brace members 43, 44 with the inclined legs 40 and 41 enable releasable clamping by means of the C-clamps at their distal ends as well as at the mounting plate 17 without the use of bolts or other permanent attachment to the sidewalls S or front wall F.

The brace assembly as described integrates the entire hoist mechanism and facilitates clamping of the hoist mechanism in such a way as to avoid the use of bolts or other fasteners in securing to the bed. An advantage of the corner mounting, in addition to angular reinforcement as described, is to facilitate the loading and unloading of objects onto and from the truck bed by swinging the boom member outwardly or laterally in the manner illustrated in FIG. 3 to a position alongside the truck to an inboard position as shown in full. For instance, the cable can be released under the control of the winch assembly to pick up a sling or other carrier containing the articles to be loaded which is positioned on the ground alongside the truck, and the cable is wound onto the reel 28 to lift the load over the sidewall of the truck bed, then swiveled into a position to deposit the load in the truck bed by lowering the cable. Alternately, the cable may be guided over the pulley 24 as alluded to earlier and advanced rearwardly of the truck bed and over the tailgate to assist in loading articles from the rear end of the truck bed. For example, heavy objects may be drawn upwardly along a ramp from the rear of the truck bed.

A preferred form of dump body is illustrated in FIGS. 1 to 3 and 6 for use in combination with the swivel hoist mechanism 10 in loading and hauling materials on the truck bed. As illustrated in FIGS. 1 to 3 and 6, the dump body is comprised of a low profile, generally rectangular frame and more specifically in the form of an open framework having upper and lower horizontally extending bars 51, 52 on opposite sides of the frame, and upper and lower horizontal bars 53, 54 at opposite ends of the frame. Vertically extending bars 55 are disposed at each of the four corners together with intermediate vertically extending bars 56 between corners and horizontally extending bars 58 along the bottom of the frame between the lower frame members 54 at opposite ends. In the form illustrated, and as best seen from FIG. 6, all of the bars are in the form of hollow tubes and interconnected by three-way fittings 60 at the corners and four-way fittings 62 for interconnection of the vertical braces 56, upper and lower end frame members 53 and 54 and the horizontal braces 58. A flexible but non-stretchable liner 64 is dimensioned to conform to the rectangular configuration of the frame and is preferably connected to the frame by lacing a cord 65 through grommets 66 formed along the upper edge of the liner and to result in an open container having opposite sidewalls 70 and a front end wall 72 and rear wall 74. The rear wall 74 has extra material which is folded or gathered together as at 75 so that when released by the cord 65 along the upper rear frame member 53 the rear wall is free to expand outwardly and downwardly into a lowered position as designated at 74' in FIG. 2. Preferably, the folded-over portion at 75 is interconnected together by hooks 76, as illustrated in FIG. 3, when in the raised or closed position and secured to the end frame 53.

As shown in FIGS. 3 and 6, straps 78 are secured to the front end frame 54 at the lower front end of the dump body with an intermediate ring 80 between the straps 78 to facilitate engagement with the hook 37 on the cable 30 of the hoist mechanism 10. When engaged by the hook 37 and the cable 30 is wound by the winch, the dump body is lifted upwardly as illustrated in FIG. 2 and caused to tilt about its lower rear end frame 54. As a preliminary to tilting or dumping, the rear end wall 74 is released as described so that the contents can be emptied from the body through the open rear end thereof. In this relation, a particular advantage of the use of a flexible liner is that will discourage any tendency of the dump body to slip as it is being tilted thereby obviating pivotal connection of the dump body to the rear end of the truck bed. The liner is lightweight and may be composed of a canvas, duck, rubber-reinforced material or a similar material and can be easily cleaned for reuse. When not in use, the dump body may be removed from the truck bed and stored.

The swivel hoist mechanism is dimensioned to be of a height such that the boom 15 will afford ample clearance for lifting and advancing articles or materials over the side of the truck bed into and from the dump body or bed itself. In addition, the boom 15 is of a length such that it will extend slightly beyond the center of the truck bed so that it can impart a direct vertically applied lifting action to the front end of the dump body during dumping operations. The swivel hoist can be removed from the truck bed simply by releasing the clamp members at the lower ends of the braces and at the mounting plate whereupon the entire hoist mechanism can be removed and stored as a single unit.

It is therefore to be understood that while a preferred form of invention has been set forth and described herein, various modifications and changes may be made without departing from the spirit and scope of the present invention as defined by the appended claims and reasonable equivalents thereof.

I claim:

1. In apparatus for loading and unloading materials onto and from a truck bed having sidewalls, a swivel hoist mechanism comprising a standard including an upper inclined boom member, means mounting said boom member for swinging movement between a position in which a free end of said boom member is disposed inside of said truck bed and a position outside of said truck bed, cable guide means on said boom member, a winch assembly including a cable extending upwardly along said standard and said boom member, said cable having a free end portion to be secured to an article to be loaded and unloaded, and means for releasably securing said standard to a front corner of said truck bed, horizontal brace members extending from said standard at substantially right angles to one another above said truck bed sidewalls and inclined brace members extending downwardly from said standard at substantially right angles to one another, each of said inclined brace members connected at a lower end to one of said horizontal brace members, said mounting means having a base mounting plate extending above said truck bed sidewalls including an upwardly directed sleeve, and said standard disposed in swivelled relation to said sleeve, and said releasable securing means including clamping members for releasably clamping said horizontal brace members to said truck bed sidewalls and clamping members for clamping said mounting plate to said truck bed sidewalls.

2. In apparatus according to claim 1, said swivel hoist mechanism including support means for suspending said winch assembly beneath said standard and spaced above the floor surface of said truck bed.

3. In apparatus according to claim 1, said cable guide means defined by pulley members at opposite ends of said boom, said standard being hollow, and said cable extending upwardly through said standard and over said pulley members.

4. In apparatus according to claim 3, including a lower pulley guide member spaced above said winch assembly and beneath said standard to guide rearward extension of said cable along said truck bed.

5. Loading and unloading apparatus for a pickup truck wherein said truck includes a truck bed having opposite sidewalls, front end wall, floor surface and a tailgate, said apparatus comprising:
a standard including an upper boom member, means mounting said boom member for swinging movement between a position in which a free end of said boom member is disposed inside of said truck bed and a position outside of said truck bed, cable guide means on said boom, a winch assembling including a cable extending upwardly along said standard and said boom, said cable having a free end portion to be secured to an article to be loaded and unloaded, and means for releasably securing said standard to said truck bed; and
a dump body for the loading and removal of contents into and from said dump body including an outer frame sized for disposition in said truck bed, and an inner flexible liner secured to said frame and having one end wall releasably secured to said frame, and means attaching said one end wall to said frame, said attaching means being releasable to lower said one end wall of said liner into a position defining an open end for the removal of contents from said dump body.

6. In apparatus according to claim 5, including inclined brace members extending downwardly from said standard at substantially right angles to one another, and said releasable securing means securing said standard at a front corner of said truck bed.

7. In apparatus according to claim 6, said mounting means having a base mounting plate including an upwardly directed sleeve, and said standard disposed in swiveled relation to said sleeve, said releasable securing means including clamping members for clamping said mounting plate to one of said front corners of said truck bed.

8. In apparatus according to claim 7, said releasable securing means including clamping members for clamping said lower ends of said brace members to said truck bed.

9. In apparatus according to claim 5, including support means for suspending said winch assembly beneath said standard and spaced above the floor surface of said truck bed.

10. In apparatus according to claim 5, said cable guide means defined by pulley members at opposite ends of said boom, said standard being hollow, and said cable extending upwardly through said standard and over said pulley members.

11. In apparatus according to claim 10, including a lower pulley guide member spaced above said winch assembly and beneath said standard to guide rearward extension of said cable along said truck bed.

* * * * *